US012682536B2

(12) United States Patent
Lee et al.

(10) Patent No.: US 12,682,536 B2
(45) Date of Patent: Jul. 14, 2026

(54) MOTION GENERATION DEVICE FOR GENERATING MOTION BASED ON INPUT INFORMATION INCLUDING TEXT AND OPERATION METHOD THEREOF

(71) Applicant: AILIVE INC., Seongnam-si (KR)

(72) Inventors: Dohee Lee, Seongnam-si (KR); Kyoungchin Seo, Bucheon-si (KR); Jihun Kim, Gunpo-si (KR); Jungmin Chung, Yongin-si (KR)

(73) Assignee: AILIVE INC., Seongnam-si (KR)

( * ) Notice: Subject to any disclaimer, the term of this patent is extended or adjusted under 35 U.S.C. 154(b) by 0 days.

(21) Appl. No.: 19/191,347

(22) Filed: Apr. 28, 2025

(65) Prior Publication Data

US 2025/0259366 A1    Aug. 14, 2025

Related U.S. Application Data

(63) Continuation of application No. PCT/KR2023/018352, filed on Nov. 15, 2023.

(30) Foreign Application Priority Data

Oct. 12, 2023    (KR) ........................ 10-2023-0135540

(51) Int. Cl.
G06T 13/40        (2011.01)
A63F 13/428      (2014.01)
G06F 40/30        (2020.01)

(52) U.S. Cl.
CPC ............ G06T 13/40 (2013.01); A63F 13/428 (2014.09); G06F 40/30 (2020.01)

(58) Field of Classification Search
None
See application file for complete search history.

(56) References Cited

U.S. PATENT DOCUMENTS

| | | | |
|---|---|---|---|
| 2020/0035008 A1* | 1/2020 | Kwon | G06V 40/25 |
| 2020/0160881 A1* | 5/2020 | Gadgil | A61B 5/4803 |
| 2024/0087558 A1* | 3/2024 | Oplustil Gallegos | G10L 13/08 |

FOREIGN PATENT DOCUMENTS

| | | |
|---|---|---|
| KR | 10-2018-0023879 A | 3/2018 |
| KR | 102116309 B1 | 5/2020 |

(Continued)

OTHER PUBLICATIONS

Tevet et al.; "MotionCLIP: Exposing Human Motion Generation to CLIP Space"; Computer Vision—ECCV 2022: 17th European Conference, Tel Aviv, Israel; 2022; pp. 1-10.

(Continued)

*Primary Examiner* — Tapas Mazumder
(74) *Attorney, Agent, or Firm* — Studebaker Brackett PLLC

(57)        ABSTRACT

Disclosed is a motion generation device for generating motion based on input information including a text and an operation method thereof, and the motion generation device may include a memory configured to store at least one instruction; and at least one processor configured to execute the at least one instruction stored in the memory, wherein the at least one processor is configured to: obtain the input information including the text representing a movement of a character, extract feature information from the obtained input information, generate motion data for the movement of the character using the extracted feature information, obtain correction motion data by post-processing the generated motion data, and generate motion animation of the character based on the obtained correction motion data.

5 Claims, 9 Drawing Sheets

(56)　　　　　References Cited

FOREIGN PATENT DOCUMENTS

| KR | 102461267 | B1 | 11/2022 |
| KR | 10-2023-0075998 | A | 5/2023 |
| KR | 10-2023-0095432 | A | 6/2023 |

OTHER PUBLICATIONS

International Search Report issued in PCT/KR2023/018352; mailed Jun. 28, 2024.
Office Action issued in KR 10-2023-0135540; mailed by the Korean Intellectual Property Office on Aug. 13, 2024.

\* cited by examiner

FIG. 2

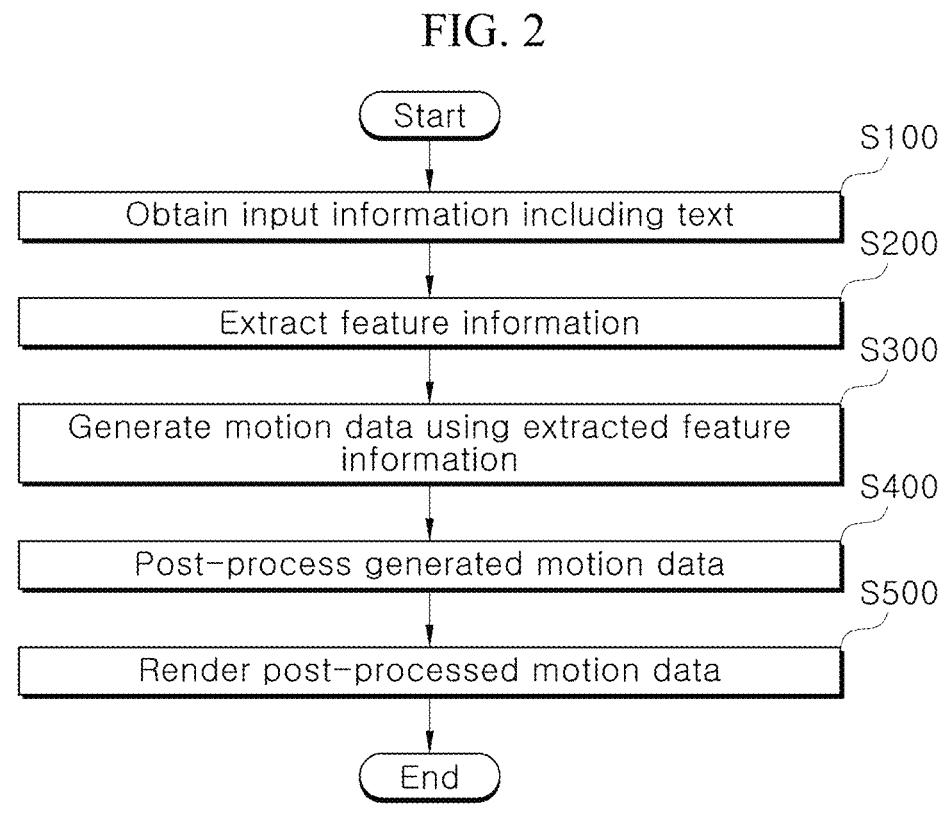

Start

Obtain input information including text    S100

Extract feature information    S200

Generate motion data using extracted feature information    S300

Post-process generated motion data    S400

Render post-processed motion data    S500

End

MOTION GENERATION DEVICE FOR GENERATING MOTION BASED ON INPUT INFORMATION INCLUDING TEXT AND OPERATION METHOD THEREOF

CROSS-REFERENCE TO RELATED APPLICATIONS

The present application is a continuation of International Patent Application No. PCT/KR2023/018352, filed on Nov. 15, 2023, which is based upon and claims the benefit of priority to Korean Patent Application No. 10-2023-0135540 filed on Oct. 12, 2023. The disclosures of the above-listed applications are hereby incorporated by reference herein in their entirety.

BACKGROUND

1. Technical Field

The present disclosure relates to a motion generation device, and more particularly, to a motion generation device for generating motion based on input information including a text and an operation method thereof.

2. Description of Related Art

Recently, with the advancement of technology, techniques are being used to extract features from texts, by considering the content of the text or the context of the text, estimate the motion of characters such as avatars, or generate the motion of characters that perform actions included in the text.

However, there may be cases where it is difficult to explain all the motions of the character to be generated with only the input of text. In addition, even if the motion of the character generated based on the input of text is different from the intended one and a new character motion is generated by inputting the modified text again, there is still a problem in which the motion of the character that is different from the intention is generated.

SUMMARY

A user may want to generate motion animation of a character performing an imagined motion by inputting text or additionally inputting text and control elements other than text. At this time, the control elements may be elements that can provide information about the motion of the character to be generated.

In addition, in the case that the motion data generated by the input text or text and control elements is analyzed and it is determined that the motion data includes unnatural motions that should be filtered out, unnatural motions based on a physics engine, or unnatural motions according to a trained artificial intelligence model, correction motion data can be generated through post-processing to remove or improve the motions.

A motion animation of a character can be generated through correction motion data, and at this time, an editing function can be provided to select a character for which a motion animation is to be generated or to select motion data to be applied to the character.

Technical problems of the inventive concept are not limited to the technical problems mentioned above, and other technical problems not mentioned will be clearly understood by those skilled in the art from the following description.

In an aspect of the present disclosure, a motion generation device may include a memory configured to store at least one instruction; and at least one processor configured to execute the at least one instruction stored in the memory, wherein the at least one processor is configured to: obtain the input information including the text representing a movement of a character, extract feature information from the obtained input information, generate motion data for the movement of the character using the extracted feature information, obtain correction motion data by post-processing the generated motion data, and generate motion animation of the character based on the obtained correction motion data.

In another aspect of the present disclosure, a method of operating a motion generation device for generating motion based on input information including text may include obtaining the input information including the text representing a movement of a character, extracting feature information from the obtained input information, generating motion data for the movement of the character using the extracted feature information, obtaining correction motion data by post-processing the generated motion data, and generating motion animation of the character based on the obtained correction motion data.

In addition, a computer-readable recording medium recording a computer program for implementing the present disclosure may be further provided.

BRIEF DESCRIPTION OF THE FIGURES

FIG. 2 is a flowchart for describing an operation of the motion generative device according to one embodiment of the present disclosure.

DETAILED DESCRIPTION

Figure 1:
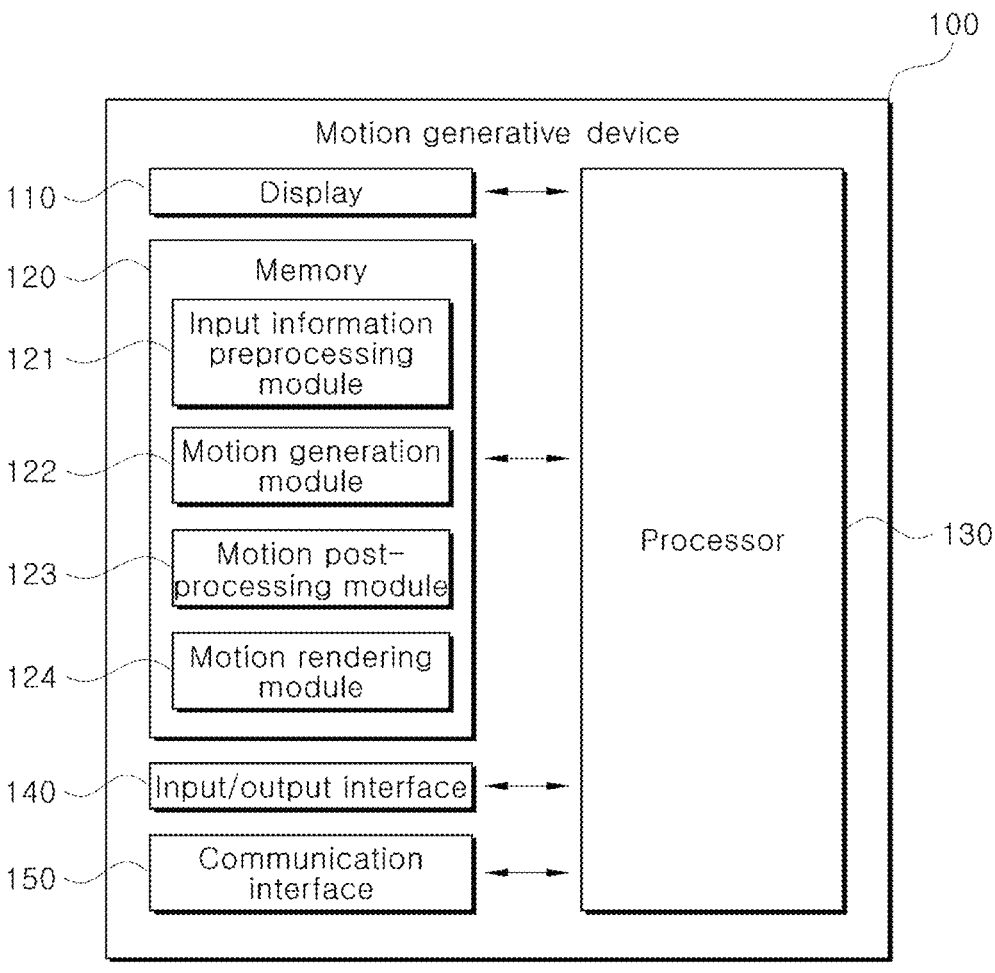
FIG. 1 is a block diagram illustrating a configuration of a motion generation device according to one embodiment of the present disclosure.

In the drawings, the same reference numeral refers to the same element. This disclosure does not describe all elements of embodiments, and general contents in the technical field to which the present disclosure belongs or repeated contents of the embodiments will be omitted. The terms, such as "unit, module, member, and block" may be embodied as hardware or software, and a plurality of "units, modules, members, and blocks" may be implemented as one element, or a unit, a module, a member, or a block may include a plurality of elements.

Furthermore, when a certain part "includes" a certain element, other elements are not excluded unless explicitly described otherwise, and other elements may in fact be included.

The terms "first," "second," and the like are just to distinguish an element from any other element, and elements are not limited by the terms.

The singular form of the elements may be understood into the plural form unless otherwise specifically stated in the context.

Identification codes in each operation are used not for describing the order of the operations but for convenience of description, and the operations may be implemented differently from the order described unless there is a specific order explicitly described in the context.

The operating principle and embodiments of the present disclosure are described below with reference to the attached drawings.

In this specification, the term 'device according to the present disclosure' includes all of various devices that can perform computational processing and provide results to the user. For example, the device may include all of a computer, a server device, and a portable terminal, or may be in the form of one of them.

Here, the computer may include, for example, a notebook, a desktop, a laptop, a tablet PC, a slate PC, and the like mounted with a web browser.

The server device is a server that communicates with an external device to process information, and may include an application server, a computing server, a database server, a file server, a mail server, a proxy server, and a web server.

A portable terminal is a wireless communication device that ensures portability and mobility, and may include all kinds of handheld-based wireless communication devices such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), WiBro (Wireless Broadband Internet) terminal, a smart phone, and the like, and a wearable device such as at least one of a watch, a ring, bracelets, anklets, a necklace, glasses, contact lenses, or a head-mounted device (HMD).

The function related to artificial intelligence according to the present disclosure operates through a processor and a memory. The processor may be composed of one or more processors. At this time, the one or more processors may be a general-purpose processor such as a CPU, an AP, a DSP (Digital Signal Processor), a graphics-only processor such as a GPU, a VPU (Vision Processing Unit), or an artificial intelligence-only processor such as an NPU. The one or more processors control input data to be processed according to a predefined operation rule or artificial intelligence model stored in the memory. Alternatively, in the case that the one or more processors are artificial intelligence-only processors, the artificial intelligence-only processor may be designed as a hardware structure specialized for processing a specific artificial intelligence model.

The predefined operation rule or artificial intelligence model may be created through learning. Here, being created through learning means that a basic artificial intelligence model is trained by using a plurality of learning data by a learning algorithm, thereby creating a predefined operation rule or artificial intelligence model set to perform a desired feature (or, purpose). Such learning may be performed on the device itself in which the artificial intelligence according to the present disclosure is performed, or may be performed through a separate server and/or system. Examples of learning algorithms include supervised learning, unsupervised learning, semi-supervised learning, or reinforcement learning, but are not limited to the examples described above.

FIG. 1 is a block diagram illustrating a configuration of a motion generation device according to one embodiment of the present disclosure.

In one embodiment, a motion generation device 100 may be a device that receives input information including a text representing a movement of a character and generates motion animation of the character based on the input information. In one embodiment, the motion generation device 100 may be used to generate motion animation of a character by inputting a text or text and additional control elements (e.g., audio, image, video, pose, emotion, style, etc.) related to the movement of the character for the movement of the character to be generated.

In this case, the character may be an object that may have a movement, such as a person, an animal, a character in a novel or a cartoon, an avatar, a character in a game, and the like, and is not limited thereto. The motion animation may mean a video or at least one image that may represent the character or the movement of the character.

Referring to FIG. 1, in one embodiment, the motion generative device 100 may include a display 110, a memory 120, the at least one processor 130, an input/output interface 140, and a communication interface 150. However, the components illustrated in FIG. 1 are not essential for implementing the motion generative device 100 according to the present disclosure. In one embodiment, the motion generative device 100 described in this specification may have more or fewer components than the components listed above. The display 110, the memory 120, and the at least one processor 130, the input/output interface 140, and the communication interface 150 may be electrically and/or physically connected to each other, respectively.

In one embodiment, the display 110 may display information processed or generated by the motion generative device 100. The display 110 may display an input interface provided by the motion generation device 100.

In one embodiment, the display 110 may display execution screen information of an application program driven by the motion generation device 100, or UI (User Interface) or GUI (Graphical User Interface) information according to such execution screen information.

In one embodiment, the at least one processor 130 may control the display 110 to display a UI or GUI, thereby providing an input interface to a user using the motion generation device 100. The user may provide a text indicating a movement of a character, a control element related to a movement of a character, or post-processing information to the motion generation device 100 through the input interface displayed on the display 110.

In one embodiment, the at least one processor 130 may control the display 110 to display motion data generated based on input information or motion animation of a character. In one embodiment, the at least one processor 130 may provide the generated motion data or the motion animation of the character to a user through the display 110. The user may input post-processing information or terminate the generation of the motion animation of the character through the motion data or the motion animation of the character displayed on the display 110.

However, the present disclosure is not limited thereto, and the motion generation device 100 may not include the display 110. The motion generation device 100 may also generate the motion animation based on the input information obtained through the input/output interface 140 or the communication interface 150 described below.

In one embodiment, the memory 120 may store data supporting various functions of the motion generation device 100 and a program for the operation of the at least one processor 130, may store input/output data (e.g., sentences, music files, still images, video images, etc.), may store a plurality of application programs or applications driven by the device, at least one data for the operation of the device, and at least one instruction.

In one embodiment, the memory 120 may include an input information preprocessing module 121, a motion generation module 122, a motion post-processing module 123, and a motion rendering module 124 for performing an operation of generating motion based on input information including text. A 'module' included in the memory 120 may mean a unit that processes a function or operation performed by the at least one processor 130. The 'module' included in the memory 120 may be implemented as software such as instructions, algorithms, or program codes. At least some of these applications may be downloaded from an external server via wireless communication.

In one embodiment, each of the input information preprocessing module 121, the motion generation module 122, the motion postprocessing module 123, and the motion rendering module 124 may include an artificial intelligence model that has been pre-trained to perform each operation. The artificial intelligence model may include a plurality of neural network layers. Each of the plurality of neural network layers has a plurality of weight values, and performs a neural network operation through an operation between the operation result of the previous layer and the plurality of weights. The plurality of weights of the plurality of neural network layers may be optimized by the learning result of the artificial intelligence model. For example, the plurality of weights may be updated so that the loss value or cost value acquired from the artificial intelligence model is reduced or minimized during the learning process. The artificial neural network may include a deep neural network (DNN), for example, a convolutional neural network (CNN), a deep neural network (DNN), a recurrent neural network (RNN), a restricted boltzmann machine (RBM), a deep belief network (DBN), a bidirectional recurrent deep neural network (BRDNN), a transformer, deep Q-networks, or a boosting algorithm, but is not limited to the examples described above.

Each of the modules 121, 122, 123, and 124 may include an artificial intelligence model optimized through transfer learning and fine tuning of a pre-trained model to perform the corresponding operation.

The memory 120 may include at least one type of storage medium among a flash memory type, a hard disk type, a Solid State Disk (SSD) type, a Silicon Disk Drive (SDD) type, a multimedia card micro type, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. In addition, the memory may be a database that is separate from the motion generation device 100 but connected by wire or wirelessly.

In one embodiment, the at least one processor 130 may be a general-purpose processor such as a CPU, an AP, a Digital Signal Processor (DSP), a graphics-only processor such as a GPU, a Vision Processing Unit (VPU), or an artificial intelligence-only processor such as an NPU. The at least one processor controls processing of patient-related information according to instructions stored in a memory or an artificial intelligence model. Alternatively, in the case that the at least one processor is an artificial intelligence-dedicated processor, the artificial intelligence-dedicated processor may be designed with a hardware structure specialized for processing a specific artificial intelligence model.

In one embodiment, the at least one processor 130 may control overall operations of the motion generation device 100. In one embodiment, the at least one processor 130 may control operations of the motion generation device 100 by executing at least one or more instructions stored in a memory 120. In one embodiment, the at least one processor 130 may perform an operation of generating a motion based on input information including text by executing at least one of the instructions or program codes of the input information preprocessing module 121, the motion generation module 122, the motion post-processing module 123, or the motion rendering module 124 included in the memory 120.

In one embodiment, the input/output interface 140 is for receiving information from a user or an external source, or providing information to an external source. When input information is input through the input/output interface 140, the at least one processor 130 may control the motion generation device 100 to generate a motion based on the input information. In addition, the motion generation device 100 may provide the generated motion to a peripheral electronic device through the input/output interface 140.

In one embodiment, the input/output interface 140 may be displayed through the display 110. In addition, the input/output interface 140 may include a device such as a mouse, a keyboard, and the like. In one embodiment, the user may input input information including text using a keyboard, and the like, and may receive generated motions through the display.

In addition, the input/output interface 140 may include a voice input interface such as a microphone. In one embodiment, the user may input control elements using a microphone, and the like.

In one embodiment, the communication interface 150 may perform data communication between an external server or other electronic devices in the vicinity and the motion generation device 100.

In one embodiment, the communication interface 150 may include one or more components that enable communication with an external server or other electronic devices in the vicinity, and may include at least one of a wireless communication module, a short-range communication module, and a location information module, for example.

The wireless communication module may include a wireless communication module that supports various wireless communication methods such as a WiFi module, a WiBro (Wireless broadband) module, GSM (Global System for Mobile Communication), CDMA (Code Division Multiple Access), WCDMA (Wideband Code Division Multiple Access), UMTS (Universal Mobile Telecommunications System), TDMA (Time Division Multiple Access), LTE (Long Term Evolution), 4G, 5G, and 6G.

The wireless communication module may include a wireless communication interface including an antenna and a transmitter for transmitting a data signal. In addition, the wireless communication module may further include a data signal conversion module that modulates a digital control signal output from the at least one processor 130 through the wireless communication interface into an analog wireless signal under the control of the at least one processor 130.

The wireless communication module may include a wireless communication interface including an antenna and a receiver for receiving a data signal. In addition, the wireless communication module may further include a data signal conversion module for demodulating an analog wireless signal received through a wireless communication interface into a digital control signal.

The short-range communication module is for short-range communication, and may support short-range communication using at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct, and Wireless USB (Wireless Universal Serial Bus) technologies.

In one embodiment, the motion generation device 100 may communicate with an external server or a peripheral electronic device through the communication interface 150. In one embodiment, the external server may include an application server, a computing server, a database server, a file server, a game server, a mail server, a proxy server, and a web server.

In one embodiment, the external server or the peripheral electronic device may include a model including a method for generating motion based on input information including text described in the present disclosure. The motion generative device 100 may receive a model including a method for generating motion based on input information including text from the external server or the peripheral electronic device through an input/output interface 140.

Hereinafter, for convenience of explanation, an operation for generating motion based on input information including text description is described as being performed in the motion generative device 100.

Figure 3:
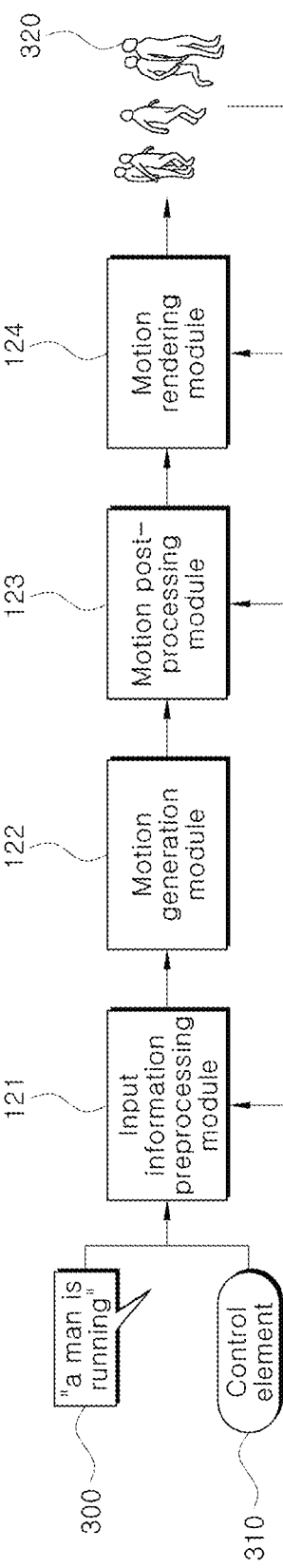
FIG. 3 is a diagram for describing an operation of the motion generative device according to one embodiment of the present disclosure.

FIG. 2 is a flowchart for describing an operation of the motion generative device according to one embodiment of the present disclosure. FIG. 3 is a diagram for describing an operation of the motion generative device according to one embodiment of the present disclosure.

Referring to FIGS. 2 and 3, in one embodiment, the operating method of the motion generative device 100 may include a step S100 of obtaining input information including a text 300 indicating movement of a character. In one embodiment, the at least one processor 130 may obtain input information including the text 300 in the step of obtaining input information (step S100).

In one embodiment, the text 300 may represent the movement of a character. In FIG. 3, the text 300 is illustrated as "a main is running." The text 300 illustrated in FIG. 3 may include information about the movement of a male character, "a man is running." In one embodiment, the text 300 may include information about the subject of the movement and the content of the movement. However, the present disclosure is not limited thereto, and the text 300 may include information about the movement of various characters.

In one embodiment, the input information may further include a control element 310 related to the movement of the character. In one embodiment, the control element 310 may include at least one of audio, emotion, style of movement, image, pose, or video related to the movement of the character.

In one embodiment, the audio included in the control element 310 may be the character's voice, or may include background music indicating a mood, and the like. In one embodiment, the emotion included in the control element 310 may include an emotional state that may affect the character's movement (e.g., happy, depressed, confident). In one embodiment, the movement style included in the control element 310 may include a style of the character's movement (e.g., exaggerated behavior, girlish feeling, etc.). In one embodiment, the image included in the control element 310 may include an image of a specific pose or an image indicating a specific mood. In one embodiment, the pose included in the control element 310 may include a keyframe pose that needs to be taken in the middle of the character's movement (e.g., a clapping pose at 1 second, a sitting pose on a chair at 3 seconds, etc.). In one embodiment, the video included in the control element 310 may include a moving image that represents a reference person or animal's behavior (e.g., a video of an Olympic gymnast competing).

In one embodiment, the operating method of the motion generation device 100 may include a step S200 of extracting feature information of the obtained input information. In one embodiment, the at least one processor 130 may extract feature information of the input information by executing commands or program codes of the input information preprocessing module 121 in the step S200 of extracting feature information of the input information.

In one embodiment, the input information preprocessing module 121 may be configured with commands or program codes related to an operation or function of converting the provided input information into a form for generating motion data using the motion generation module 122 described below. In one embodiment, the input information preprocessing module 121 may be configured with commands or program codes for performing a preprocessing operation, such as removing noise included in the input information, before extracting feature information using the input information. Hereinafter, the input information preprocessing module 121 will be described later with reference to FIG. 4.

In one embodiment, the operating method of the motion generation device 100 may include a step S300 of generating motion data for the movement of the character by using the extracted feature information. In one embodiment, the at least one processor 130 may generate motion data for the movement of the character by executing instructions or program codes of the motion generation module 122 in the step S300 of generating the motion data.

In one embodiment, the motion generation module 122 may be configured with instructions or program codes for an operation or function of generating motion data for the movement of the character by using the extracted feature information. In one embodiment, the motion generation module 122 may be configured with instructions or program codes for an operation or function of converting the feature information into motion feature for generating motion data. In one embodiment, the motion generation module 122 may be configured with instructions or program codes for an operation or function of generating motion data including information about the position of the character or information about the angle of the joint of the character by using the converted motion feature. Hereinafter, the motion generation module 122 will be described below in FIG. 5.

In one embodiment, the operation method of the motion generative device 100 may include a step S400 of post-processing the generated motion data to obtain correction motion data. In one embodiment, the at least one processor 130 may execute instructions or program codes of the motion post-processing module 123 in the step S400 of obtaining correction motion data, thereby post-processing the generated motion data to obtain correction motion data.

In one embodiment, the motion post-processing module 123 may be configured with instructions or program codes related to an operation or function of post-processing the generated motion data to obtain correction motion data. In one embodiment, the motion post-processing module 123 may determine the degree of post-processing of the generated motion data by analyzing the generated motion data and using post-processing information including the degree of post-processing of the acquired motion data, and may post-process the motion data according to the determined degree of post-processing to obtain correction motion data. In one embodiment, the motion generation device 100 may provide the user with a function to edit the character motion animation during the process of generating the motion animation of the character through the motion post-processing module 123. Hereinafter, the editing function may be performed through post-processing of motion data.

In one embodiment, the motion post-processing module 123 may include at least one of a filtering-based unnatural motion improvement module, an artificial intelligence-based unnatural motion improvement module, or a physics engine-based unnatural motion improvement module. Hereinafter, the motion post-processing module 123 will be described below with reference to FIGS. 6 to 9.

In one embodiment, the operation method of the motion generative device 100 may include a step S500 of generating the motion animation of the character based on the post-processed motion data. In the step S500 of generating the motion animation of the character, the post-processed motion data may be rendered to generate the motion animation.

In one embodiment, the at least one processor 130 may generate motion animation of the character by rendering the post-processed motion data by executing commands or program codes of the motion rendering module 124 in the step S500 of generating motion animation of the character.

In one embodiment, the motion rendering module 124 may be configured with commands or program codes regarding an operation or function of rendering correction motion data to the character using the post-processed motion data to generate motion animation of the character. However, the present disclosure is not limited thereto, and in the case that it is determined that the motion data generated using the motion generation module 122 does not require post-processing, the motion rendering module 124 may be configured with commands or program codes regarding an operation or function of rendering motion data to the character using the motion data to generate motion animation of the character. Hereinafter, the motion rendering module 124 will be described below with reference to FIG. 10.

In one embodiment, the at least one processor 130 may re-perform at least one of the following operations: extracting feature information of input information through the input information preprocessing module 121, obtaining correction motion data through the motion postprocessing module 123, or generating motion animation through the motion rendering module 124, based on the result of the generated motion animation. The at least one processor 130 may change a coefficient used when performing at least one of the following operations: extracting feature information of input information through the input information preprocessing module 121, obtaining correction motion data through the motion postprocessing module 123, or generating motion animation through the motion rendering module 124, based on the result of the generated motion animation, and repeat the operations so that an appropriate motion animation is generated.

Figure 4:
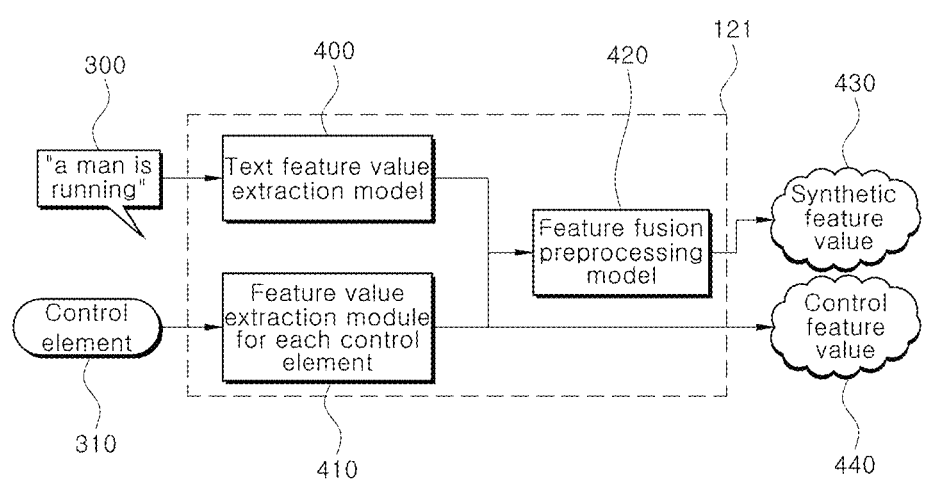
FIG. 4 is a diagram for describing an operation of input information preprocessing module according to one embodiment of the present disclosure.

FIG. 4 is a diagram for describing an operation of the input information preprocessing module according to one embodiment of the present disclosure.

Referring to FIG. 1, FIG. 3, and FIG. 4, in one embodiment, the input information preprocessing module 121 may include a text feature extraction model 400, a feature extraction model 410 for each control element, and a feature fusion preprocessing model 420.

In one embodiment, the text feature extraction model 400 may extract a text feature by identifying the character included in the acquired text 300, the feature of the character's behavior, the intention by which the corresponding text 300 is generated, and the like. In one embodiment, when the text 300 is given as an input to the text feature extraction model 400, the text feature may be generated as an output.

In one embodiment, the feature extraction model 410 for each control element may extract information included in the obtained control element 310. In one embodiment, the feature extraction model 410 for each control element may extract corresponding information according to the types of elements included in the control element 310. In one embodiment, in the case that the control element 310 includes music, the feature extraction model 410 for each control element may extract information such as the mood of the music, the intensity of the music, and the speed of the music as the feature. In one embodiment, in the case that the control element 310 is given as an input to the feature extraction model 410 for each control element, the feature 440 for each control element may be generated as an output.

In one embodiment, the text and the each control element features may be referred to as feature information. The input information preprocessing module 121 may extract feature information based on input information including the text 300.

In one embodiment, the feature fusion preprocessing model 420 may generate a synthetic feature 430 by fusing the text feature extracted from the text feature extraction model 400 and the feature for each control element extracted from the feature extraction model 410 for each control element. In one embodiment, the synthetic feature 430 may include information about the character included in the text feature, the feature of the character's behavior, the intention for which the corresponding text 300 is generated, and the control element included in the feature for each control element.

In one embodiment, the text feature extraction model 400 may include an artificial intelligence model that has been trained in advance to infer text features by identifying the character included in the acquired text 300, the feature of the character's behavior, the intention for which the corresponding text 300 is generated, and the like. In one embodiment, the feature extraction model 410 for each control element may include an artificial intelligence model that has been pre-trained to infer the feature 440 for each control element according to the acquired control element 310. In one embodiment, the feature fusion preprocessing model 420 may include an artificial intelligence model that has been pre-trained to infer the synthetic feature 430 by fusing of the text and the each control element features.

In one embodiment, the text feature extraction model 400 may include a Seq2Seq model, BERT (Bidirectional Encoder Representations from Transformers), CNN, RNN, Attention mechanism, and the like, but is not limited thereto. In one embodiment, the feature extraction model 410 for each control element may include a 2D CNN, a 3D CNN, an Optical Flow-based model, and the like, but is not limited thereto. In one embodiment, the feature fusion preprocessing model 420 may include, but is not limited to, an Attention mechanism, a Multi-modal model (e.g., Early Fusion, Late Fusion), and the like.

Figure 5:
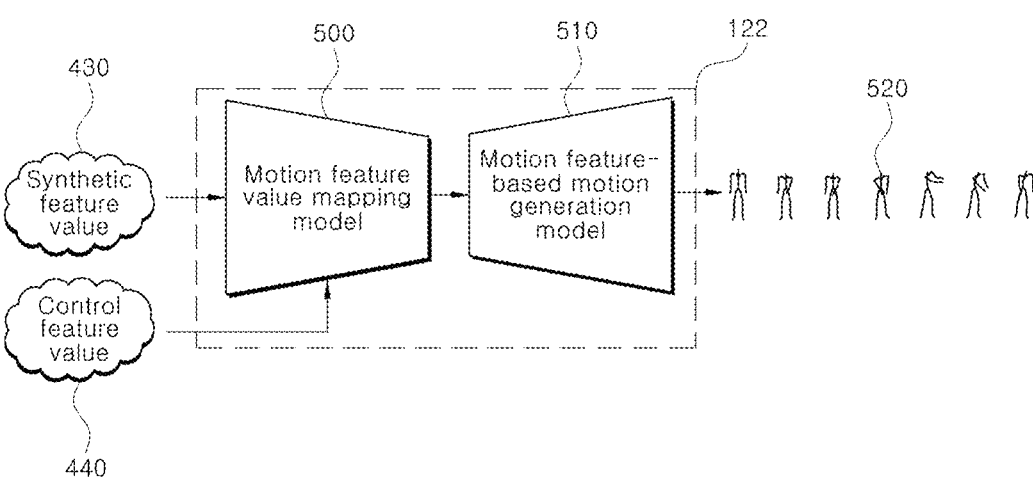
FIG. 5 is a diagram for describing an operation of the motion generation module according to one embodiment of the present disclosure.

FIG. 5 is a diagram for describing an operation of the motion generation module according to one embodiment of the present disclosure. Referring to FIGS. 1, 3, and 5, in one embodiment, the motion generation module 122 may include a motion feature mapping model 500 and a motion feature-based motion generation model 510.

In one embodiment, the motion feature mapping model 500 may map generated feature information into the motion feature for generating motion data. In one embodiment, the motion feature mapping model 500 may convert the synthetic feature 430 into the motion feature for generating motion data. In one embodiment, the motion feature mapping model 500 may use the control feature 440 in the process of converting the synthetic feature 430 into the motion feature. In the process of mapping the synthetic feature 430 into the motion feature according to the control feature 440, the mapped motion feature may be changed.

In one embodiment, the motion feature-based motion generation model 510 may generate motion data 520 using the motion feature mapped through the motion feature mapping model 500. In one embodiment, the motion data 520 may include information about the position of the character, the positions of multiple joints included in the character, the angles between the multiple joints, and the like. In one embodiment, the motion data 520 may include not only the motion information of the character in 2D, but also the motion information of the character in 3D. In one embodiment, the motion data 520 may include the motion information of the character across multiple frames.

In one embodiment, the motion feature mapping model 500 may include an artificial intelligence model that is pre-trained to map the generated synthetic feature 430 or the synthetic feature 430 and the control feature 440 to the motion feature for generating the motion data 520. In one embodiment, the motion feature-based motion generation model 510 may include an artificial intelligence model that is pre-trained to infer the motion data 520 using the motion feature mapped through the motion feature mapping model 500. In one embodiment, the motion feature mapping model 500 and the motion feature-based motion generation model 510 may include an artificial intelligence model that is pre-trained together to infer the motion data 520 based on the synthetic feature 430 or the synthetic feature 430 and the control feature 440.

In one embodiment, in the step S300 of generating the motion data 520, the motion data 520 may be generated from the feature information using an artificial intelligence model trained to infer the motion data 520 about the movement of a character from feature information extracted from the text 300 and the control element 310.

In one embodiment, the motion feature mapping model 500 and the motion feature-based motion generation model 510 may include Seq2Seq, CNN, RNN, LSTM (Long Short-Term Memory), or Transformer. In one embodiment, the motion feature mapping model 500 may be trained in advance to convert the synthetic feature 430 generated as an encoder or the synthetic feature 430 and the control feature 440 into the motion feature. The motion feature-based motion generation model 510 may be pre-trained to infer motion data 520 using the converted motion feature as a generative model. However, this is merely an example, and the motion feature mapping model 500 and the motion feature-based motion generation model 510 are not limited to either one.

In one embodiment, the input information preprocessing module 121 and the motion generation module 122 may include an artificial intelligence model pre-trained to infer motion data of a corresponding character when text is provided by a training data set of text representing the movement of a character and motion data of a character corresponding to the text. In one embodiment, the input information preprocessing module 121 may extract the input text as feature information necessary to generate the corresponding motion data according to the pre-trained content. The motion generation module 122 may also infer the motion data 520 based on the extracted feature information.

Figure 6:
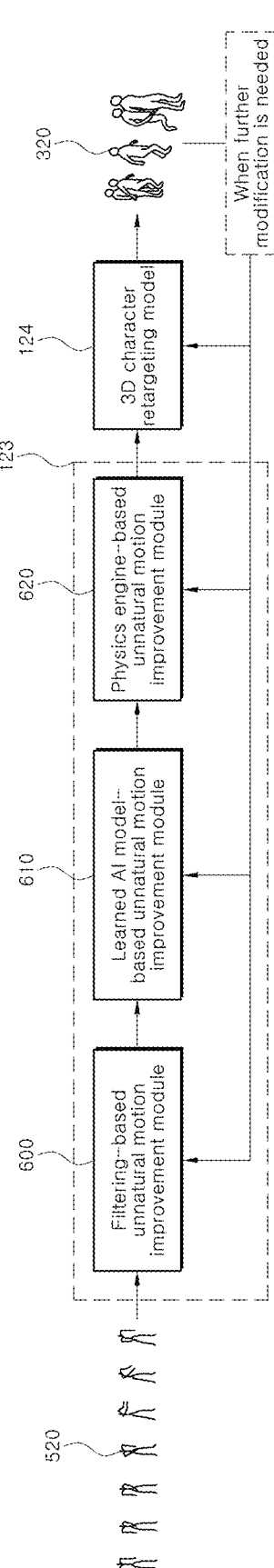
FIG. 6 is a diagram for describing an operation of the motion post-processing module according to one embodiment of the present disclosure.

FIG. 6 is a diagram for describing an operation of the motion post-processing module according to one embodiment of the present disclosure.

Referring to FIG. 1, FIG. 3, and FIG. 6, in one embodiment, the motion post-processing module 123 may generate correction motion data through post-processing that removes unnatural motion included in the motion data 520 or changes it into natural motion. In one embodiment, FIG. 6 illustrates that the motion post-processing module 123 includes all of a filtering-based unnatural motion improvement module 600, an artificial intelligence model-based unnatural motion improvement module 610, and a physics engine-based unnatural motion improvement module 620, but the present disclosure is not limited thereto. The motion post-processing module 123 may include at least one of a filtering-based unnatural motion improvement module 600, an artificial intelligence model-based unnatural motion improvement module 610, or a physics engine-based unnatural motion improvement module 620.

In addition, although FIG. 6 illustrates that the post-processing operation of the motion data 520 is sequentially performed by the filtering-based unnatural motion improvement module 600, the artificial intelligence model-based unnatural motion improvement module 610, and the physics engine-based unnatural motion improvement module 620 included in the motion post-processing module 123, the present disclosure is not limited thereto. The filtering-based unnatural motion improvement module 600, the artificial intelligence model-based unnatural motion improvement module 610, and the physics engine-based unnatural motion improvement module 620 may operate in parallel with each other. In addition, the operation order of the filtering-based unnatural motion improvement module 600, the artificial intelligence model-based unnatural motion improvement module 610, and the physics engine-based unnatural motion improvement module 620 may be different from each other.

Figure 7:
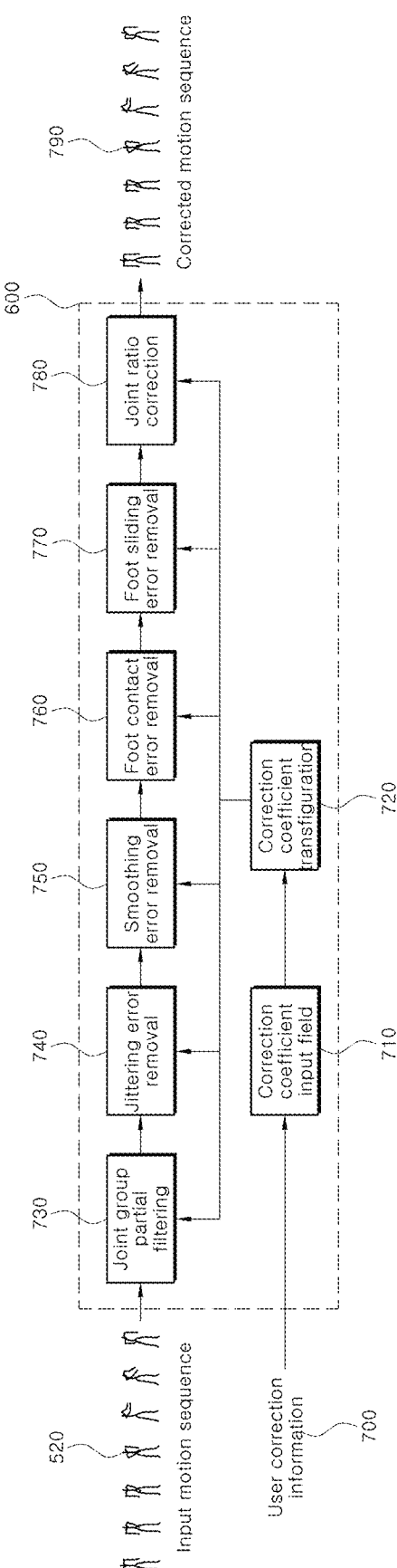
FIG. 7 is a diagram for describing an operation of the filtering-based unnatural motion improvement module according to one embodiment of the present disclosure.

FIG. 7 is a diagram for describing an operation of the filtering-based unnatural motion improvement module according to one embodiment of the present disclosure. Hereinafter, the same configuration as described in FIG. 6 is assigned with the same reference numerals, and the repeated descriptions are omitted.

Referring to FIG. 1, FIG. 3, FIG. 6, and FIG. 7, in one embodiment, the filtering-based unnatural motion improvement module 600 may obtain correction motion data 790 by post-processing the generated motion data 520 to remove errors such as jittering phenomenon, phenomenon of feet not touching a floor or slipping, phenomenon of mesh overlapping due to different ratios of retargeted characters, and the like included in the motion data 520. At this time, the motion data 520 may be referred to as an input motion sequence, and the correction motion sequence 790 may be referred to as a modified motion sequence.

In one embodiment, the filtering-based unnatural motion improvement module 600 may obtain post-processing information including the degree of post-processing of the motion data. The post-processing information may be generated by analyzing the generated motion data to reflect the degree of noise included in the motion data or whether the motion data includes specific conditions set in advance for example, conditions set to be filtered in the filtering-based unnatural motion improvement module 600. In one embodiment, the post-processing information may be generated by analyzing the generated motion data or the correction motion data that has been post-processed previously or the character motion animation generated using the correction motion data. In one embodiment, the post-processing information is illustrated as user modification information 700 in FIG. 7. In one embodiment, the post-processing information may be information generated by a user's input obtained through an input/output interface unit for example, a correction coefficient input module 710. Hereinafter, for convenience of description, the post-processing information will be referred to as the user modification information 700.

In one embodiment, the filtering-based unnatural motion improvement module 600 may obtain coefficients of a filtering algorithm for improving unnatural motion through the user modification information 700 obtained through the correction coefficient input module 710. The filtering-based unnatural motion improvement module 600 may convert coefficients of a filtering algorithm obtained through the user modification information 700 into a form corresponding to each filtering algorithm through a correction coefficient transfiguration 720.

In one embodiment, the filtering-based unnatural motion improvement module 600 may designate a joint among the skeleton joints of a character included in the motion data 520 that requires correction of an unnatural motion error through a joint group partial filtering 730 algorithm. In one embodiment, the filtering-based unnatural motion improvement module 600 may remove data in which a shaking phenomenon occurs among the motion data 520 through a jittering error removal 740 algorithm. In one embodiment, the filtering-based unnatural motion improvement module 600 may smoothen the motion of the character included in the motion data 520 or add random motion information through a smoothing error removal 750 algorithm.

In one embodiment, the filtering-based unnatural motion improvement module 600 may remove a part of the character's sole included in the motion data 520 in the case that there is a difference between the coordinate information of the sole and the coordinate information of the floor through a foot contact error removal 760 algorithm. In one embodiment, the filtering-based unnatural motion improvement module 600 may remove a part of the character's motion included in the motion data 520 where the character slips on the floor through a foot sliding error removal 770 algorithm. In one embodiment, the filtering-based unnatural motion improvement module 600 may designate a joint among the skeleton joints of the character included in the motion data 520 that requires correction of an unnatural motion error through a joint ratio modification 780 algorithm.

Although FIG. 7 illustrates that the filtering-based unnatural motion improvement module 600 sequentially uses the joint group partial filtering 730 algorithm, the jittering error removal 740 algorithm, the smoothing error removal 750 algorithm, the foot contact error removal 740 algorithm, the foot sliding error removal 770 algorithm, and the joint ratio correction 780 algorithm, the present disclosure is not limited thereto. The filtering-based unnatural motion improvement module 600 may use at least one of the respective algorithms, and the order of use may vary.

Figure 8:
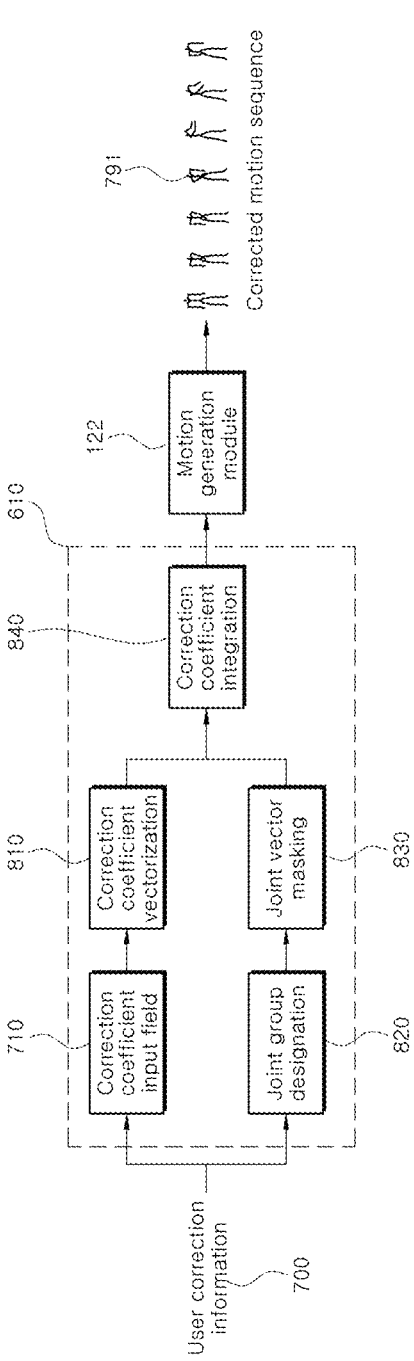
FIG. 8 is a diagram for describing an operation of the artificial intelligence model-based unnatural motion improvement module according to one embodiment of the present disclosure.

FIG. 8 is a diagram for describing an operation of the artificial intelligence model-based unnatural motion improvement module according to one embodiment of the present disclosure. Hereinafter, the same configuration as that described in FIG. 7 is given the same drawing reference numerals, and redundant descriptions are omitted.

Referring to FIG. 1, FIG. 3, and FIG. 8, in one embodiment, the artificial intelligence model-based unnatural motion improvement module 610 may perform an operation of adjusting the parameter of the motion generation module 122 to generate motion data from which unnatural motions are removed based on the generated motion data 520 through the motion generation module 122.

In one embodiment, the artificial intelligence model-based unnatural motion improvement module 610 may convert the user correction information 700 obtained through the correction coefficient input unit 710 into a vector form that may be integrated through a correction coefficient vectorization 810 algorithm. In this case, the vector form that may be integrated may mean a vector form for integration into the converted motion data to generate motion data using the motion generation module 122.

In one embodiment, the artificial intelligence model-based unnatural motion improvement module 610 may designate a skeleton joint of a character included in motion data 520 that requires error correction through a joint group designation 820 based on the user correction information 700. In one embodiment, the artificial intelligence model-based unnatural motion improvement module 610 may mask a vector representing joint information of a skeleton joint that requires error correction through a joint vector masking 830.

In one embodiment, the artificial intelligence model-based unnatural motion improvement module 610 may integrate the user correction information 700 converted into a vector form that may be integrated and masking a vector representing joint information of a skeleton joint that requires error correction through a correction coefficient integration 840. Through this, the parameter of the motion generation module 122 may be adjusted to generate motion data from which unnatural motions are removed, which is provided to the motion generation module 122. The motion generation module 122 may generate correction motion data 791 from which unnatural motions are removed, using the adjusted parameter and feature information.

Figure 9:
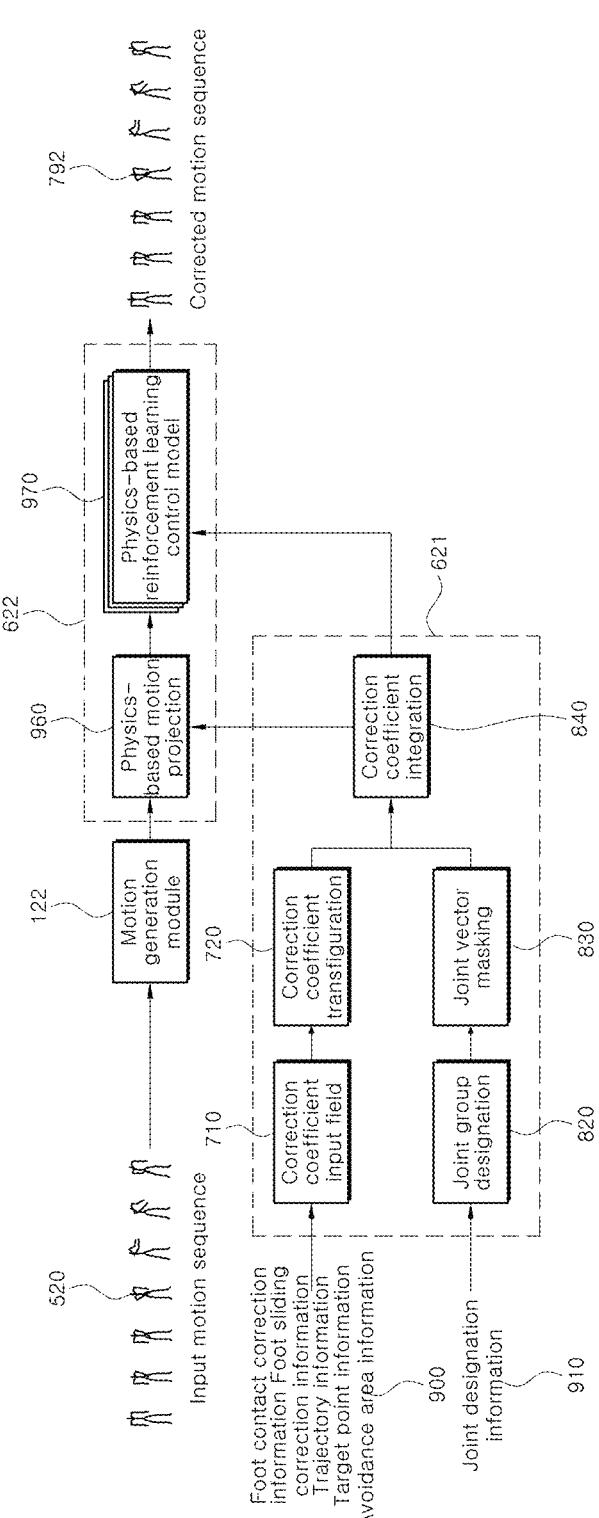
FIG. 9 is a diagram for describing an operation of the unnatural motion improvement module based on a physics engine according to one embodiment of the present disclosure.

FIG. 9 is a diagram for describing an operation of the unnatural motion improvement module based on a physics engine according to one embodiment of the present disclosure. Hereinafter, the same components as those described in FIG. 7 are given the same drawing reference numerals, and redundant descriptions are omitted.

Referring to FIG. 1, FIG. 3, and FIG. 8, in one embodiment, the unnatural motion improvement module 620 based on a physics engine utilizes a simulation technique based on a physics engine to the generated motion data 520 to remove unnatural motions included in the motion data 520, and generates an animation that matches the additional control information to obtain correction motion data 792.

In one embodiment, the physics engine-based unnatural motion improvement module 620 may include a module 621 that determines a correction coefficient that determines the degree of correction of the motion data 520 and a module 622 that post-processes motion data based on the physics engine.

In one embodiment, the physics engine-based unnatural motion improvement module 620 may obtain user correction information 900 determined according to the degree of unnatural motion included in the motion data 520 through the correction coefficient input unit 710. At this time, the degree of unnatural motion included in the motion data 520 may include at least one of foot content correction information, foot sliding correction information, trajectory information, target point information, or avoidance area information. In one embodiment, the physics engine-based unnatural motion improvement module 620 may convert the correction coefficient transformation 720 algorithm into a vector form that may be integrated. In one embodiment, the physics engine-based unnatural motion improvement module 620 may obtain joint designation information 910 that designates a skeleton joint that requires error correction among the skeleton joints of the character included in the motion data 520 through the joint group designation input module 820. In one embodiment, the physics engine-based unnatural motion improvement module 620 may mask a vector representing joint information of a skeleton joint that requires error correction through the joint vector masking 830.

In one embodiment, the physics engine-based unnatural motion improvement module 620 may integrate the user correction information 900 converted into a vector form that may be integrated and masking a vector representing joint information of a skeleton joint that requires error correction through the correction coefficient integration 840.

In one embodiment, the physics engine-based unnatural motion improvement module 620 may integrate masking of the vector that represents the user correction information 900 converted to a vector form and the joint information of the skeleton joint that is designated as requiring error correction through the correction coefficient integration 840.

In one embodiment, the physics engine-based unnatural motion improvement module 620 may modify the motion data 520 by projecting (960) a physics-based motion control condition using the integrated correction coefficient through the motion generation module 122 and feedback. In one embodiment, the physics engine-based unnatural motion improvement module 620 may modify the motion data 520 so that the character moves and operates based on the integrated correction coefficient using a physics-based reinforcement learning control model 970. In one embodiment, the physics engine-based unnatural motion improvement module 620 may generate correction motion data 792 in which unnatural motion is improved through the operation of the motion generation module 122, the physics-based motion control condition projection 960, and the physics-based reinforcement learning control model 970.

Figure 10:
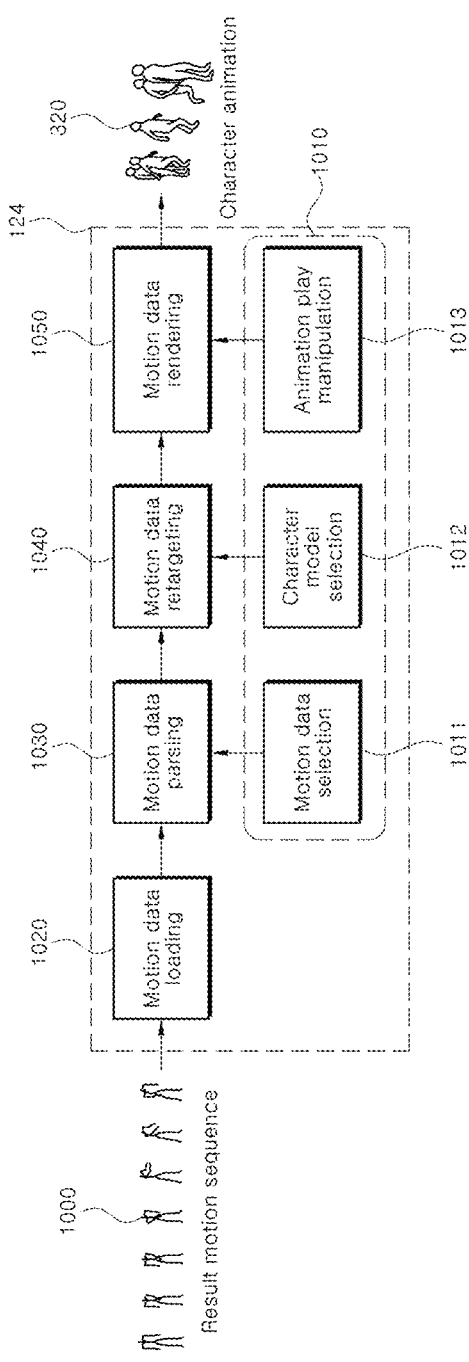
FIG. 10 is a diagram for describing an operation of the motion rendering module according to one embodiment of the present disclosure.

FIG. 10 is a diagram for describing an operation of the motion rendering module according to one embodiment of the present disclosure.

Referring to FIG. 1, FIG. 3, and FIG. 10, in one embodiment, the motion rendering module 124 may generate the motion animation 320 of a character by rendering correction motion data 1000 to the character based on the correction motion data 1000. In one embodiment, the motion rendering module 124 may generate the motion animation 320 of the character corresponding to the correction motion data 1000 by re-targeting the correction motion data 1000 to the character to visualize the generated the correction motion data 1000.

In one embodiment, the motion rendering module 124 may utilize a rendering selection signal 1010 in generating the motion animation 320 of the character. In one embodiment, the rendering selection signal 1010 may include information 1011 on motion data selection for selecting the correction motion data 1000 to be rendered among a plurality of correction motion data stored in a database. In one embodiment, the rendering selection signal 1010 may include information 1020 about selection of a character model for generating motion animation 320 using correction motion data 1000. In one embodiment, the rendering selection signal 1010 may include information 1013 for playing or stopping the character motion animation 320 for visualization of the generated the character motion animation 320.

In one embodiment, the rendering selection signal 1010 may be obtained through the input/output interface module 140 or may be acquired through the communication interface 150.

In one embodiment, the motion rendering module 124 may load (1020) the generated correction motion data 1000. At this time, the motion rendering module 124 may load the correction motion data 1000 from a database in which the generated correction motion data 1000 is stored.

In one embodiment, the motion rendering module 124 may parse (1030) the loaded correction motion data 1000, analyze the correction motion data 1000, and extract information necessary for generating the character motion animation 320. At this time, the information necessary for generating the character motion animation 320 may include the position of the character in each frame, the position of the skeleton joint of the character, the angle of the skeleton joint of the character, and the like. At this time, the motion rendering module 124 may parse the selected correction motion data 1000 based on the information 1011 for selecting the motion data included in the rendering selection signal 1010. However, the present disclosure is not limited thereto, and the motion rendering module 124 may also load the selected correction motion data 1000 from among the plurality of correction motion data included in the database based on the information 1011 for selecting the motion data included in the rendering selection signal 1010 in the step of loading 1020 the correction motion data 1000.

In one embodiment, the motion rendering module 124 may retarget 1040 the parsed correction motion data by loading it to the selected character based on the selection information 1012 of the character model included in the rendering selection signal 1010. The motion rendering module 124 may apply the parsed correction motion data by loading it to the skeleton joint of the selected character.

In one embodiment, the motion rendering module 124 may render (1050) the animation of the character to which correction motion data is retargeted based on the information 1013 included in the rendering selection signal 1010 for playing or stopping the character motion animation 320 and visualize it. In one embodiment, the motion rendering module 124 may render (1050) the animation of the character to which correction motion data is retargeted and generate the motion animation 320 of the character.

Meanwhile, the disclosed embodiments may be implemented in the form of a recording medium storing instructions executable by a computer. The instructions may be stored in the form of program codes and, when executed by a processor, may generate a program module to perform the operations of the disclosed embodiments. The recording medium may be implemented as a computer-readable recording medium.

The computer-readable recording medium includes all kinds of recording media storing instructions that may be deciphered by a computer. For example, there may be ROM (Read Only Memory), RAM (Random Access Memory), a magnetic tape, a magnetic disk, a flash memory, an optical data storage device, and the like.

The disclosed embodiments have been described with reference to the attached drawings as described above. Those skilled in the art to which the present disclosure pertains will understand that the present disclosure may be implemented in a different form from the disclosed embodiments without changing the technical idea or essential features of the present disclosure. The disclosed embodiments are exemplary and should not be construed as limiting.

According to the present disclosure, the motion generation device may input the control element that may provide additional information about the motion of the character to be generated in addition to the text, thereby generating motion animation of the character performing the intended motion.

In addition, the motion data generated in the process of generating motion animation of the character may be analyzed to filter out the unnatural motion, improve based on a physics engine, or improve using a trained artificial intelligence model. In addition, in the post-processing process, the degree of post-processing may be controlled by inputting different coefficients used in each post-processing motion.

In addition, a function for selecting a character for which motion animation is to be generated or selecting motion data to be applied may be provided, thereby allowing the user to generate motion animation of the desired character, thereby improving user convenience.

The effects of the present disclosure are not limited to the effects mentioned above, and other effects not mentioned may be clearly understood by a person skilled in the art from the description.

What is claimed is:

1. A motion generation device for generating motion based on input information including text, comprising:

a memory configured to store at least one instruction; and at least one processor configured to execute the at least one instruction stored in the memory, wherein the processor is configured to:

obtain input information for a control element having audio, emotion, style, image, pose, and video related to a movement of a character including the text;

when extracting feature information after removing noise included in the input information through an input information pre-processing module included in the memory, extract a text feature value obtained based on a characteristic of the character, a behavior characteristic of the character, and a generation intent of the text through a text feature extraction model of the input information pre-processing module;

extract a control feature value corresponding to types of elements included in the control element through a feature extraction model for each control element of the input information pre-processing module;

extract a synthetic feature value generated by fusing the text feature value and the control feature value through a feature fusion pre-processing model of the input information pre-processing module;

when generating motion data for the movement of the character from the feature information using an artificial intelligence model trained to infer the motion data for the movement of the character from the feature information through a motion generation module included in the memory, convert the synthetic feature value into a motion feature value for generating motion data using the control feature value through a motion feature mapping model of the motion generation module;

generate the motion data based on the motion feature value through a motion feature-based motion generation model of the motion generation module;

obtain correction motion data by post-processing the motion data through a motion post-processing module included in the memory;

generate motion animation of the character based on the correction motion data; and when obtaining the correction motion data, obtain the correction motion data by removing errors of a jittering phenomenon, a phenomenon of feet not being grounded on a floor or slipping, and a phenomenon of meshes overlapping due to different ratios of a retargeted character, which are included in the motion data, through a filtering-based unnatural motion improvement module of the motion post-processing module.

2. The device according to claim 1, wherein the motion post-processing module includes an artificial intelligence-based unnatural motion improvement module, or a physics engine-based unnatural motion improvement module.

3. The device according to claim 2, wherein the processor is configured to:

obtain post-processing information including a degree of post-processing of the motion data by analyzing the generated motion data, and obtain the correction motion data by post-processing the generated motion data using the obtained post-processing information.

4. A method of operating a motion generation device for generating motion based on input information including text, performed by a processor, comprising:

obtaining, by the processor, input information for a control element having audio, emotion, style, image, pose, and video related to a movement of a character including the text;

when extracting feature information after removing noise included in the input information through an input information pre-processing module included in the memory, extracting, by the processor, a text feature value obtained based on a characteristic of the character, a behavior characteristic of the character, and a generation intent of the text through a text feature extraction model of the input information pre-processing module, extracting a control feature value corresponding to types of elements included in the control element through a feature extraction model for each control element of the input information pre-processing module, extracting a synthetic feature value generated by fusing the text feature value and the control feature value through a feature fusion pre-processing model of the input information pre-processing module;

when generating motion data for the movement of the character from the feature information using an artificial intelligence model trained to infer the motion data for the movement of the character from the feature information through a motion generation module included in the memory, converting, by the processor, the synthetic feature value into a motion feature value for generating motion data using the control feature value through a motion feature mapping model of the motion generation module, generating the motion data based on the motion feature value through a motion feature-based motion generation model of the motion generation module;

obtaining, by the processor, correction motion data by post-processing the motion data through a motion post-processing module included in the memory; and generating, by the processor, motion animation of the character based on the correction motion data; and when obtaining the correction motion data, obtaining, by the processor, the correction motion data by removing errors of a jittering phenomenon, a phenomenon of feet not being grounded on a floor or slipping, and a phenomenon of meshes overlapping due to different ratios of a retargeted character, which are included in the motion data, through a filtering-based unnatural motion improvement module of the motion post-processing module.

5. The method according to claim 4, wherein the motion post-processing module includes an artificial intelligence-based unnatural motion improvement module, or a physics engine-based unnatural motion improvement module.

* * * * *

20